US009588403B2

(12) United States Patent
Man (10) Patent No.: US 9,588,403 B2
(45) Date of Patent: Mar. 7, 2017

(54) STROBE DEVICE (71) Applicant: Nissin Industries LTD, North Point (CN)

(72) Inventor: Chun Nin Man, North Point (CN)

(73) Assignee: NISSIN INDUSTRIES LTD., Hong Kong (CN)

(*) Notice: Subject to any disclaimer, the term of this patent is extended or adjusted under 35 U.S.C. 154(b) by 71 days.

(21) Appl. No.: 14/606,086

(22) Filed: Jan. 27, 2015

(65) Prior Publication Data
US 2015/0212392 A1    Jul. 30, 2015

(30) Foreign Application Priority Data

Jan. 30, 2014  (JP) .................................. 2014-015443

(51) Int. Cl.
*G03B 15/02*      (2006.01)
*G03B 15/06*      (2006.01)
*G03B 15/05*      (2006.01)
*F21V 14/04*      (2006.01)

(52) U.S. Cl.
CPC .............. *G03B 15/06* (2013.01); *F21V 14/04* (2013.01); *G03B 15/05* (2013.01); *G03B 2215/0592* (2013.01)

(58) Field of Classification Search
CPC ................ G03B 15/06; G03B 15/0442; G03B 2215/0585; G03B 2215/0582; G03B 2215/0525; G03B 2215/0528; F21V 17/105; F21V 17/02; F21V 17/05; F21V 14/04; F21V 14/045; F21V 14/00; F21V 14/08; F21V 14/085; F21V 11/18; F21V 11/186; F21V 7/18; F21V 1/08

USPC ..................... 362/18, 16, 187, 280, 277, 319
See application file for complete search history.

(56) References Cited

U.S. PATENT DOCUMENTS

| 4,797,796 A * | 1/1989 | Eastman, II .............. F21L 4/00 |
| | | 362/199 |
| 7,278,965 B2 * | 10/2007 | Shimizu .............. A61B 1/00163 |
| | | 335/205 |
| 2005/0128739 A1 * | 6/2005 | Sansolo .................. A45B 25/02 |
| | | 362/191 |

(Continued)

FOREIGN PATENT DOCUMENTS

JP         H10307318 A      11/1998

*Primary Examiner* — Peggy Neils
*Assistant Examiner* — William N Harris
(74) *Attorney, Agent, or Firm* — Dority & Manning, P.A.

(57) ABSTRACT

A strobe device including, a strobe main body including a light emitting surface; a plate-like reflector provided on the strobe main body so as to be movable between a use position in which the reflector protrudes forward from the light emitting surface of the strobe main body and a storing position in which the reflector is retracted backward from the use position; a reflector magnetic member made of ferromagnetic material or permanent magnet and attached to the reflector; and a main body magnetic member made of ferromagnetic material or permanent magnet and attached to the strobe main body, wherein when the reflector approaches at least one of the use position and the storing position, the main body magnetic member magnetically attracts the reflector magnetic member and holds the reflector at the one of the use position and the storing position by magnetic attraction.

4 Claims, 7 Drawing Sheets

(56) References Cited

U.S. PATENT DOCUMENTS

2010/0208371 A1\* 8/2010 Chao ..................... F21V 14/02
359/824
2015/0092417 A1\* 4/2015 Hoog ..................... F21S 8/026
362/277

\* cited by examiner

STROBE DEVICE

TECHNICAL FIELD

The present invention relates to a strobe device, and more specifically to a strobe device for taking a picture including a plate-like reflector which is called a reflector board.

BACKGROUND OF THE INVENTION

Portraits, etc. are often taken using forced flash of a strobe device (daylight-sync) and a reflector board. In such shootings, since a strobe device equipped with a reflector board is not available, it is necessary to prepare a reflector board in addition to the strobe device.

A strobe device having a reflector removably attached to the strobe device main body is known (refer to, for example, JP H10-307318 A). In the strobe device disclosed in JP H10-307318 A, though the reflector is removably attached to the strobe device main body, the reflector is configured to reflect the light from a discharge tube in the forward direction, and thus, the reflector does not function as a reflector board used for taking portraits, etc. In addition, when the reflector is not used, it is necessary to remove the reflector from the strobe device main body and to store and carry the reflector separately from the strobe device main body.

SUMMARY OF THE INVENTION

An object to be achieved by the present invention is to eliminate the need to prepare a reflector board (reflector) separate from a strobe device when a picture is taken using the reflector board together with strobe light.

The strobe device according to one aspect of the present invention is a strobe device (10) including: a strobe main body (14) including a light emitting surface (26); a plate-like reflector (30) provided on the strobe main body (14) so as to be movable between a use position in which the reflector (30) protrudes forward from the light emitting surface (26) of the strobe main body (14) and a storing position in which the reflector (30) is retracted backward from the use position; a reflector magnetic member (34) made of ferromagnetic material or permanent magnet and attached to the reflector (30); and a main body magnetic member (36, 38) made of ferromagnetic material or permanent magnet and attached to the strobe main body (14), wherein when the reflector approaches at least one of the use position and the storing position, the main body magnetic member (36, 38) magnetically attracts the reflector magnetic member (34) and holds the reflector (30) at the one of the use position and the storing position by magnetic attraction.

According to this structure, since the reflector (30) serving as a reflector board is attached to the strobe main body (14) so as to be movable between the use position and the storing position, when a picture is taken using the reflector board (reflector) together with strobe light, it is not necessary to prepare a reflector board separate from the strobe device, and when a picture is taken without using the reflector board (reflector), the reflector (30) can be retracted to the storing position and thus does not become disturbing or cumbersome. In addition, the reflector magnetic member (34) and the main body magnetic member (36, 38) magnetically attract each other such that the reflector (30) is held at one of the use position and the storing position, and thus, it is possible to prevent the reflector (30) from inadvertently moving toward the storing position when the reflector (30) is in use and/or to prevent the reflector (30) from inadvertently protruding forward from the strobe main body (14) when the reflector (30) is not in use.

In the strobe device according to a preferred embodiment of the present invention, the reflector (30) is mounted so as to be slidable along an outer wall (14A) of the strobe main body (14), such that the reflector (30) moves between the use position and the storing position by sliding relative to the strobe main body (14), wherein the main body magnetic member (36, 38) and the reflector magnetic member (34) are provided in the outer wall (14A) of the strobe main body (14) and a surface of the reflector (30) facing the outer wall (14A), respectively.

According to this structure, a sliding movement of the reflector (30) does not change the distance between the main body magnetic member (36, 38) and the reflector magnetic member (34) in the mutually facing direction (i.e., in the direction perpendicular to the sliding direction), but changes the distance between the main body magnetic member (36, 38) and the reflector magnetic member (34) in the sliding direction. When the reflector (30) is moved to approach the use position or the storing position, the reflector magnetic member (34) approaches the main body magnetic member (36, 38), whereby the reflector magnetic member (34) is magnetically attracted by the main body magnetic member (36 38), and thus, the reflector (30) is inevitably brought to the use position or the storing position by the magnetic force.

Preferably, when the reflector (30) is located in the one of the use position and the storing position, the main body magnetic member (36, 38) and the reflector magnetic member (34) are displaced from each other in a sliding direction of the reflector (30) such that the main body magnetic member (36, 38) magnetically attracts the reflector magnetic member (34) to urge the reflector (30) toward the one of the use position and the storing position.

According to this structure, even when the reflector (30) is located in the use position or the storing position, a magnetic force in a direction to keep the position is always applied to the reflector (30).

Also preferably, the outer wall (14A) of the strobe main body (14) is provided with a protruding ridge (32D) extending in a sliding direction of the reflector (30), wherein the reflector (30) slidably contacts the ridge (32D).

According to this structure, the sliding movement of the reflector (30) is carried out with low friction resistance.

According to the strobe device of a preferred embodiment of the present invention, since the reflector serving as a reflector board is attached to the strobe main body so as to be movable between the use position and the storing position, when a picture is taken using the reflector board (the reflector) together with strobe light, it is not necessary to prepare a reflector board separate from the strobe device, and when a picture is taken without using the reflector board (reflector), the reflector can be retracted to the storing position and thus does not become disturbing or cumbersome.

BRIEF DESCRIPTION OF THE DRAWINGS

Now the present invention is described in the following in terms of preferred embodiments thereof with reference to the appended drawings, in which.

DETAILED DESCRIPTION OF THE PREFERRED EMBODIMENTS

In the following, an embodiment of a strobe device according to the present invention will be described with reference to FIGS. 1-5.

Figure 1:
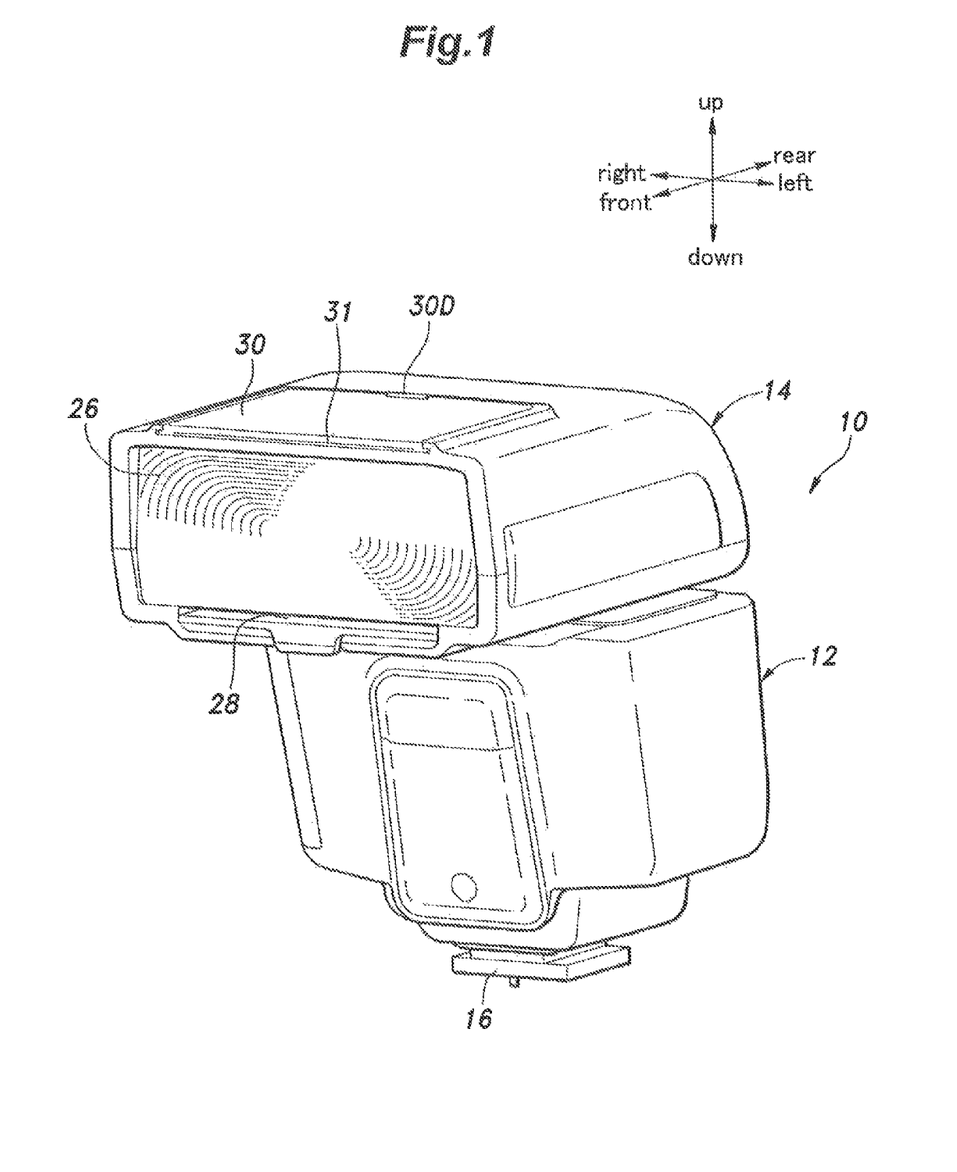
FIG. 1 is a front perspective view of an embodiment of a strobe device according to the present invention.
Figure 2:
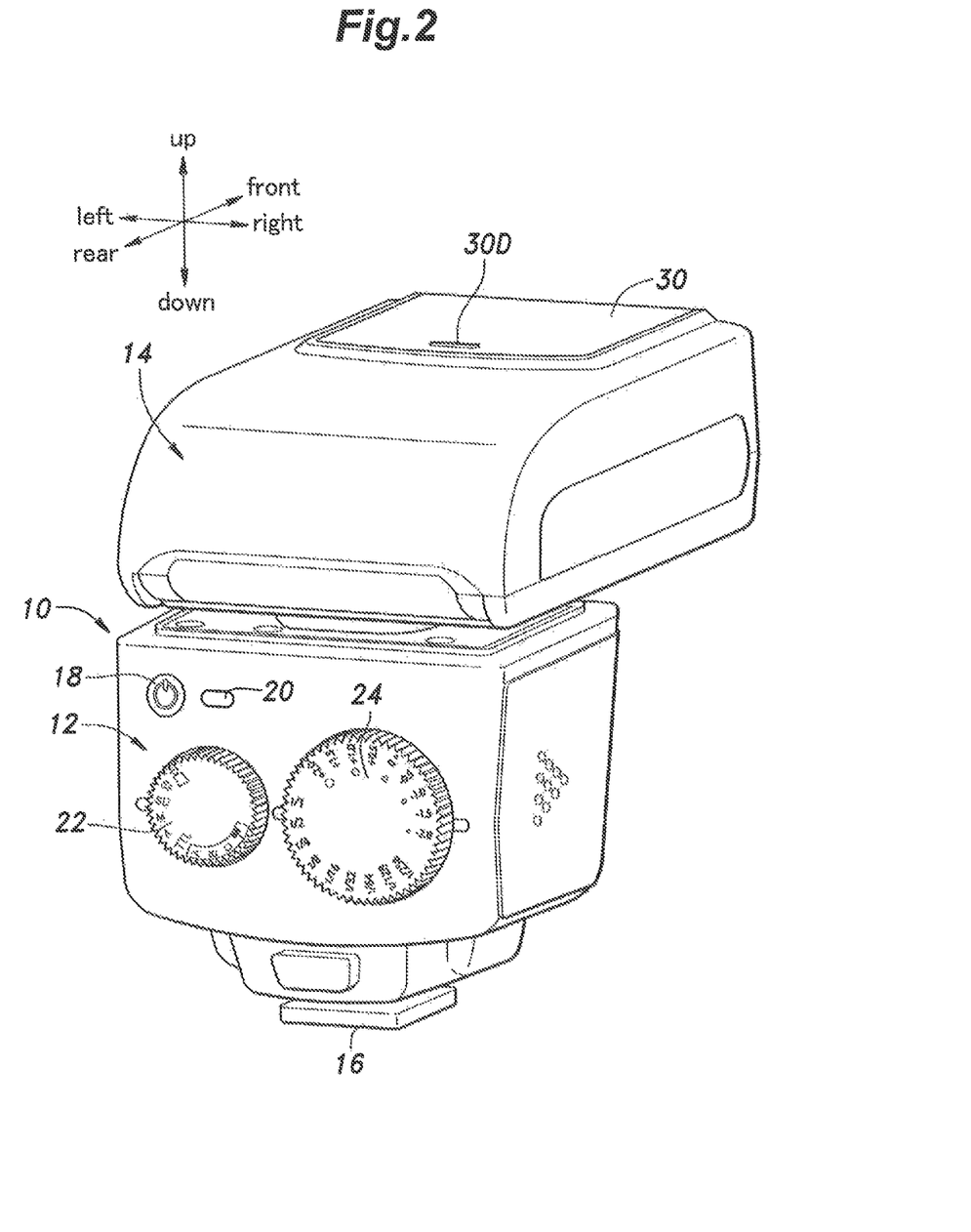
FIG. 2 is a back perspective view of the strobe device according to the present embodiment.

As shown in FIGS. 1 and 2, the strobe device 10 includes a lower strobe main body 12 and an upper strobe main body 14 which is attached to an upper portion of the lower strobe main body 12 so as to be pivotable around a vertical axis and a horizontal axis.

The lower strobe main body 12 has a mounting portion 16 at its lower bottom to be mounted to a camera (not shown) and contains a battery case, an electrical components, a control circuit, etc. therein. A rear portion of the lower strobe main body 12 is provided with a power switch button 18, a power indicator 20, a mode selection dial 22 and a number setting dial 24.

The upper strobe main body 14 includes an internal flash light source such as a xenon discharge tube and has a light emitting surface 26 composed of a Fresnel lens at a front portion thereof. The upper strobe main body 14 includes a wide angle diffuser panel 28 which is storable at a lower side of the light emitting surface 26 and a plate-like reflector (a reflector board) 30 which is storable at an upper side of the light emitting surface 26.

Now, the reflector 30 will be described in detail with reference to FIGS. 3-5. The reflector 30 is a flat plate-like member having a rectangular shape as seen in a plan view and includes a white reflection sheet 31 attached to its under surface except for a rear portion. A recess 32 which upwardly opens and which has substantially the same shape as that of the reflector 30 as seen in a plan view is formed on an upper surface of an upper wall 14A of the upper strobe main body 14. The reflector 30 is provided in the recess 32 so as to be slidable in the fore and aft direction.

Left and right outer edges of the reflector 30 extend in parallel with each other in the fore and aft direction and are each provided with a linear guiding ridge 30A which extends in the fore and aft direction. Left and right side walls of the recess 32 extend in parallel with each other in the fore and aft direction and are each provided with a linear guiding groove 32A which extends in the fore and aft direction. Each linear guiding ridge 30A slidably engages the corresponding linear guiding groove 32A. This engagement enables the sliding movement of the reflector 30 in the fore and aft direction to be carried out as a parallel displacement without any skew or inclination.

On a bottom wall of the recess 32, upward protruding ridges 32D (refer to FIG. 5) are formed to be spaced apart from each other in the left and right (width) direction such that the ridges 32D each extend in the direction of the sliding movement of the reflector 30 (fore and aft direction). Specifically, the ridges 32D are formed on left and right sides of a stopper guiding groove 32B which will be described in the following. An under surface of the reflector 30 slidably contacts the upper strobe main body 14 only at a bottom (upward facing) surface of each of the linear guiding groove 32A and the ridges 32D, whereby the sliding movement of the reflector 30 is carried out with low friction resistance.

A stopper protrusion 30B is formed in the rear portion of the underside of the reflector 30 (the portion Where the reflection sheet 31 is not attached) at an intermediate part between the left and right outer edges, namely at a central part in the left and right (width) direction of the reflector 30. The stopper guiding groove 32B extending in the fore and aft direction is formed at a central portion in the left and right (width) direction of the bottom of the recess 32. The stopper protrusion 30B slidably engages the stopper guiding groove 32B and limits the forward sliding movement of the reflector 30 by abutting a front end wall (not shown in the drawings) of the stopper guiding groove 32B.

Figure 4:
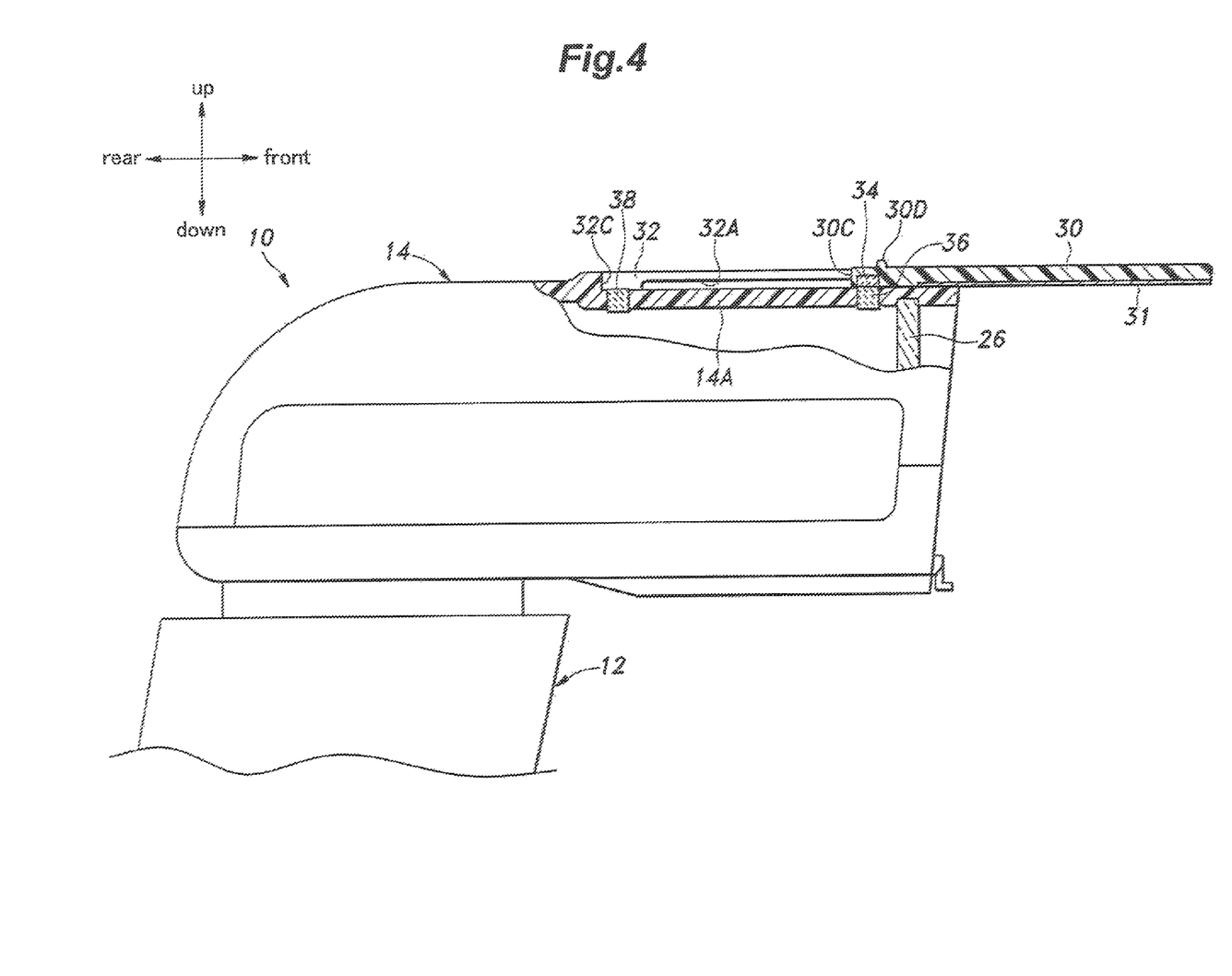
FIG. 4 is a partial cross sectional view of the strobe device according to the present embodiment with the reflector in a use position.

The most forward position of the reflector 30 defined by the abutment of the stopper protrusion 30B against the front end wall of the stopper guiding groove 32B is a use position of the reflector 30 in which the substantially entire part of the reflection sheet 31 protrudes forward from the light emitting surface 26 (refer to FIG. 4).

The most backward position of the reflector 30 is defined by abutment of a rear end wall 30C of the reflector 30 against a rear end wall 32C of the recess 32. The most backward position is a storage position in which the entirety of the reflector 30 is located in the recess 32 and in which the reflector 30 does not protrude forward from the upper strobe main body 14. This storage position is a position retracted backward from the use position.

Since the reflector 30 can be stored in this manner, the reflector 30 does not become disturbing or cumbersome when the reflector 30 is not used. In the storing position of the reflector 30, the white reflection sheet 31 is not exposed to the outside, and thus, the reflection sheet 31 is prevented from touching other things and being stained. Namely, protection of the reflection sheet 31 is provided.

An upper portion of the reflector 30 is provided with a ridge 30D which is to be engaged by a fingertip of a user when the reflector 30 is slid between the use position and the storing position by the user using the fingertip.

A small size (short cylinder shaped) reflector permanent magnet 34 (serving as a reflector magnetic member) is embedded in the rear portion of the underside of the reflector 30 (the portion where the reflection sheet 31 is not attached) such that one magnetic pole (for example, S pole) is exposed from the underside of the reflector 30 to the outside.

A small size (short cylinder shaped) use position permanent magnet 36 (serving as a main body magnetic member) is embedded in the bottom wall of the recess 32 of the upper strobe main body 14 such that the other magnetic pole (for example, N pole) is exposed from the upper side of the bottom wall of the recess 32 to the outside so as to oppose the reflector permanent magnet 34 squarely when the reflector 30 is in its use position as shown in FIG. 4.

Figure 3:
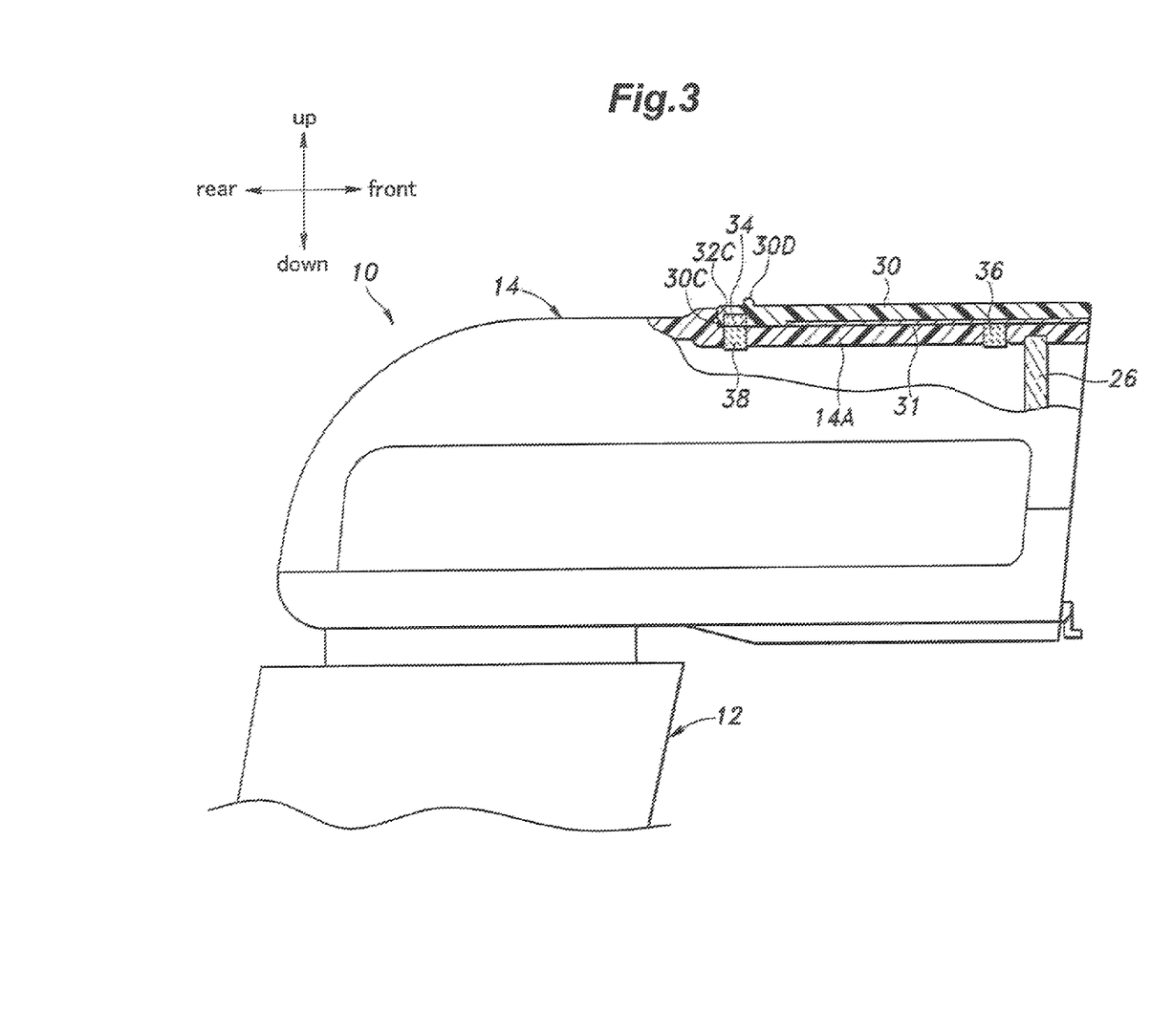
FIG. 3 is a partial cross sectional view of the strobe device according to the present embodiment with a reflector in a storing position.

A small size (short cylinder shaped) storing position permanent magnet 38 (serving as a main body magnetic member) is embedded in the bottom wall of the recess 32 of the upper strobe main body 14 such that the other magnetic pole (for example, N pole) is exposed from the bottom wall of the recess 32 to the outside so as to oppose the reflector permanent magnet 34 squarely when the reflector 30 is in its storing position as shown in FIG. 3.

Thus, the use position permanent magnet 36 and the storing position permanent magnet 38 are provided in the outer wall of the upper strobe main body 14 while the reflector permanent magnet 34 is provided in the surface of the upper strobe main body 14 facing the outer wall of the upper strobe main body 14 in the up and down direction. The sliding movement of the reflector 30 causes the position of the reflector permanent magnet 34 relative to the use position permanent magnet 36 and the storing position permanent magnet 38 to change in the direction of the sliding movement of the reflector 30.

When the reflector 30 approaches the use position as a result of the sliding movement, the use position permanent magnet 36 magnetically attracts the reflector permanent magnet 34 to urge the reflector 30 toward the use position and when the reflector 30 approaches the storing position as a result of the sliding movement, the storing position permanent magnet 38 magnetically attracts the reflector permanent magnet 34 to urge the reflector 30 toward the storing position.

Figure 5:
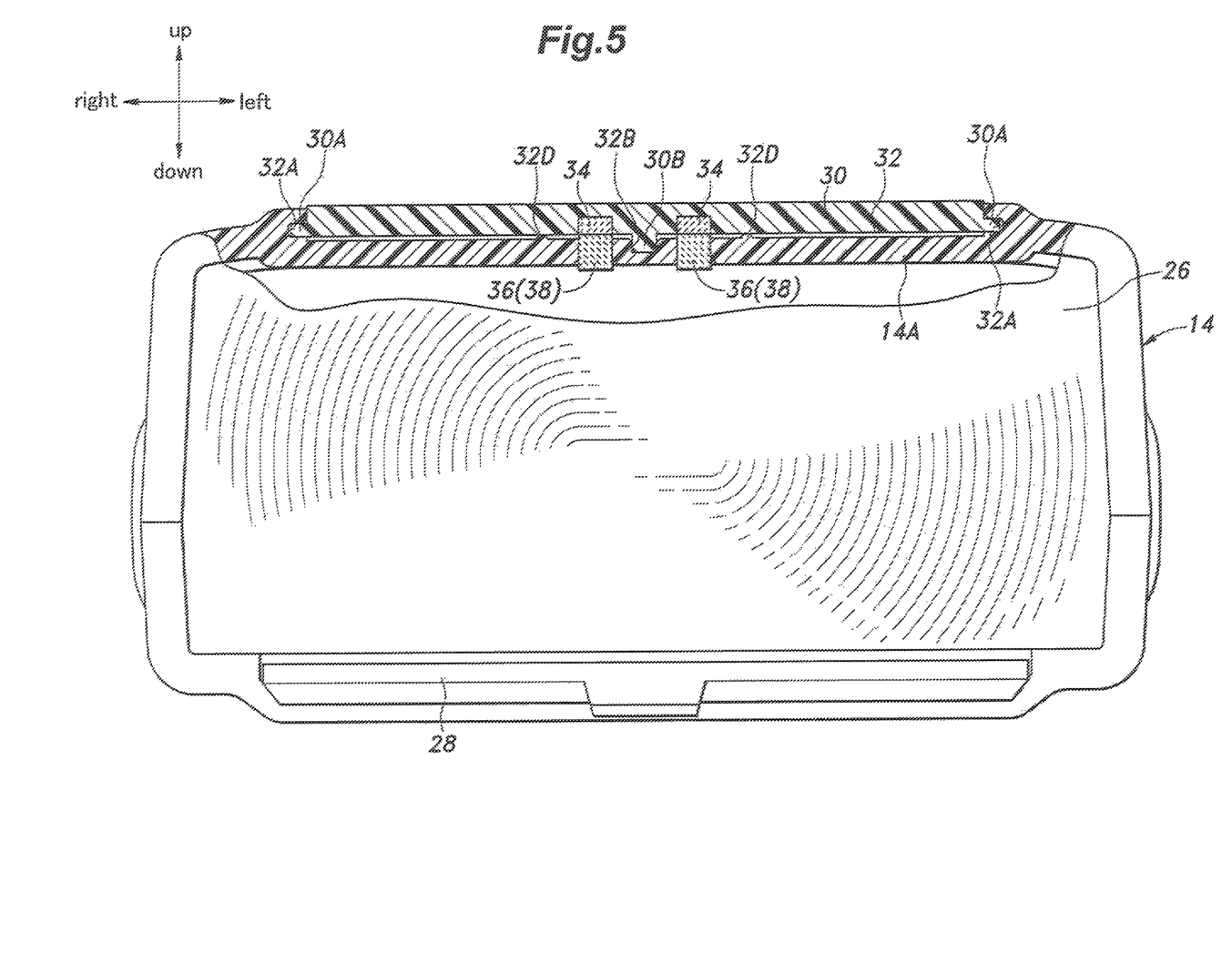
FIG. 5 is a front view of a primary portion of the strobe device according to the present embodiment.

It is to be noted that, as shown in FIG. 5, each of the reflector permanent magnet 34, the use position permanent magnet 36 and the storing position permanent magnet 38 consists of a pair of magnets located on left and right sides of the stopper protrusion 30B (or the stopper guiding groove 32B) at the same position along the sliding direction of the reflector 30.

According to the above-described structure, when the reflector 30 is in the storing position as shown in FIG. 3, the reflector permanent magnet 34 and the storing position permanent magnet 38 oppose each other squarely in the up and down direction, and the reflector permanent magnet 34 and the storing position permanent magnet 38 magnetically attract each other. Owing to this magnetic attractive force, the reflector 30 is held at the storing position with respect to the upper strobe main body 14, and the reflector 30 is stably located at the storing position without rattling, etc. as long as a sliding force (a force for causing the reflector 30 to slide forward) that overcomes the holding force exerted by the magnetic attraction is not applied. Thereby, when the reflector 30 is not used, the reflector 30 is prevented from protruding forward from the upper strobe main body 14 inadvertently.

When the reflector 30 is moved from the storing position to the use position for using the reflector 30, a force is applied to the reflector 30 by a fingertip of a user to cause the reflector 30 to slide forward. In this case, by giving the sliding force to the reflector 30 through the ridge 30D engaging the fingertip, it is possible to properly give the sliding force to the reflector 30 without the fingertip slipping.

If the forward sliding force overcomes the holding force exerted by the magnetic attraction between the reflector permanent magnet 34 and the storing position permanent magnet 38, the reflector permanent magnet 34 moves away from the storing position permanent magnet 38, and the magnetic attraction therebetween becomes weaker as the reflector 30 slides in the forward direction.

When the reflector 30 approaches the use position as a result of the forward sliding movement, the reflector permanent magnet 34 approaches the use position permanent magnet 36, whereby the reflector permanent magnet 34 is magnetically attracted by the use position permanent magnet 36. Due to this magnetic attractive force, the reflector 30 slides further forward to a position where the reflector permanent magnet 34 and the use position permanent magnet 36 squarely oppose each other in the up and down direction. Thus, the reflector 30 is inevitably brought to the use position as shown in FIG. 4 by the magnetic force, This movement is carried out effectively when the reflector 30 is adapted to slide with low friction resistance.

Thus, in the foregoing structure, it is possible to set the reflector 30 in the use position without fail only by sliding the reflector 30 close to the use position, and thus, the reflector 30 is easy to use.

When the reflector 30 is in the use position as shown in FIG. 4, the reflector permanent magnet 34 and the use position permanent magnet 36 oppose each oilier squarely in the up and down direction, and the reflector permanent magnet 34 and the use position permanent magnet 36 magnetically attract each other. Owing to this magnetic attractive force, the reflector 30 is held at the use position with respect to the upper strobe main body 14, and the reflector 30 is stably located at the use position without rattling, etc, as long as a sliding force (a force for causing the reflector 30 to slide backward) that overcomes the holding force exerted by the magnetic attraction is not applied. Thereby, when the reflector 30 is used, the reflector 30 is prevented from moving toward the storing position with respect to the upper strobe main body 14 inadvertently.

When the reflector 30 is moved back to the storing position, a force is applied to the reflector 30 by a fingertip of a user to cause the reflector 30 to slide backward. In this case also, by giving the sliding force to the reflector 30 through the ridge 30D engaging the fingertip, it is possible to properly give the sliding force to the reflector 30 without the fingertip slipping.

If the backward sliding force overcomes the holding force exerted by the magnetic attraction between the reflector permanent magnet 34 and the use position permanent magnet 36, the reflector permanent magnet 34 moves away from the use position permanent magnet 36, and the magnetic attraction therebetween becomes weaker as the reflector 30 slides in the backward direction.

When the reflector 30 approaches the storing position as a result of the backward sliding movement, the reflector permanent magnet 34 approaches the storing position permanent magnet 38, whereby the reflector permanent magnet 34 is magnetically attracted by the storing position permanent magnet 38. Due to this magnetic attractive force, the reflector 30 slides further backward to a position where the reflector permanent magnet 34 and the storing position permanent magnet 38 oppose each other squarely in the up and down direction. Thus, the reflector 30 is inevitably brought to the storing position as shown in FIG. 3 by the magnetic force. This movement is also carried out effectively when the reflector 30 is adapted to slide with low friction resistance.

Thus, in the foregoing structure, it is possible to set the reflector 30 in the storing position without fail only by sliding the reflector 30 close to the storing position, and thus, the reflector 30 is easy to use.

As described above, in the strobe device 10 of the present embodiment, each of holding of the reflector 30 in the storing position and holding of the reflector 30 in the use position is achieved by magnetic attraction, and thus, it does not require friction or mechanical engagement (impact) unlike a mechanical click (detent) or the like. Therefore, the strobe device 10 achieves smooth operation feeling of the reflector 30 and provides a sense of luxury.

Further, since each of the reflector permanent magnet 34, the use position permanent magnet 36 and the storing position permanent magnet 38 is provided as a pair of magnets located on left and right sides of the stopper protrusion 30B (or the stopper guiding groove 32B) at the same position in the sliding direction of the reflector 30, it is ensured that in each of the storing position where the reflector permanent magnet 34 and the storing position permanent magnet 38 magnetically attract each other and the use position where the reflector permanent magnet 34 and the use position permanent magnet 36 magnetically attract each other, no magnetic attractive force is applied to the reflector 30 in a direction urging the reflector 30 to be inclined with respect to the upper strobe main body 14.

Thus, the reflector 30 maintains its posture parallel to the upper strobe main body 14 both in the storing position and use position without being inclined with respect to the upper strobe main body 14.

Now, another embodiment of the strobe device according to the present invention will be described with reference to FIGS. 6 and 7. It is to be noted that, in FIGS. 6 and 7, portions corresponding to those in FIGS. 3 and 4 are denoted by the same reference numerals as in FIGS. 3 and 4 and the explanation thereof is omitted.

Figure 7:
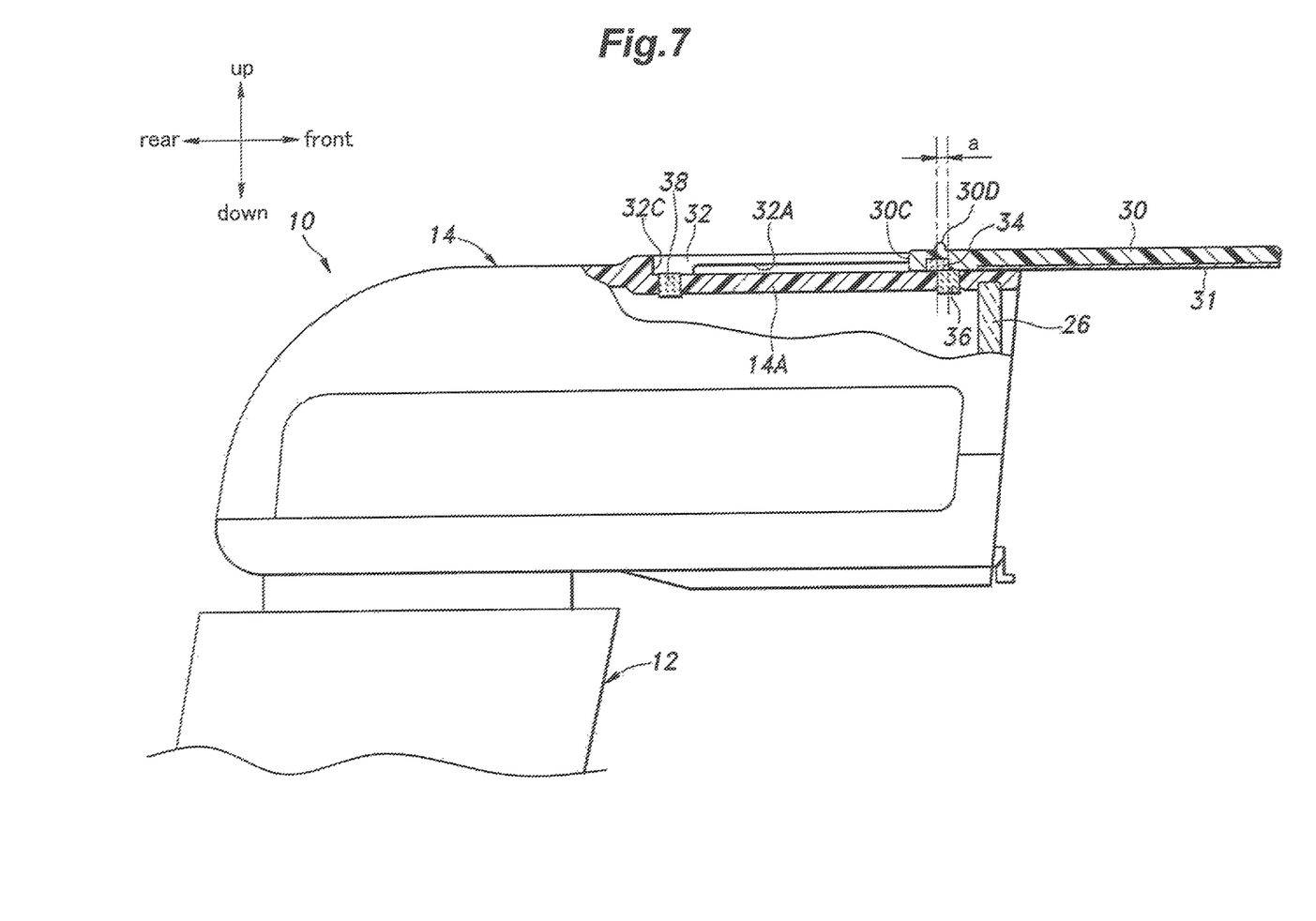
FIG. 7 is a partial cross sectional view of the strobe device according to another embodiment with the reflector in a use position.

In this embodiment, as shown in FIG. 7, when the reflector 30 is in the use position, the use position permanent magnet 36 and the reflector permanent magnet 34 are displaced from each other by a distance a in the sliding direction of the reflector 30 such that the use position permanent magnet 36 magnetically attracts the reflector permanent magnet 34 to urge the reflector 30 toward the use position.

Figure 6:
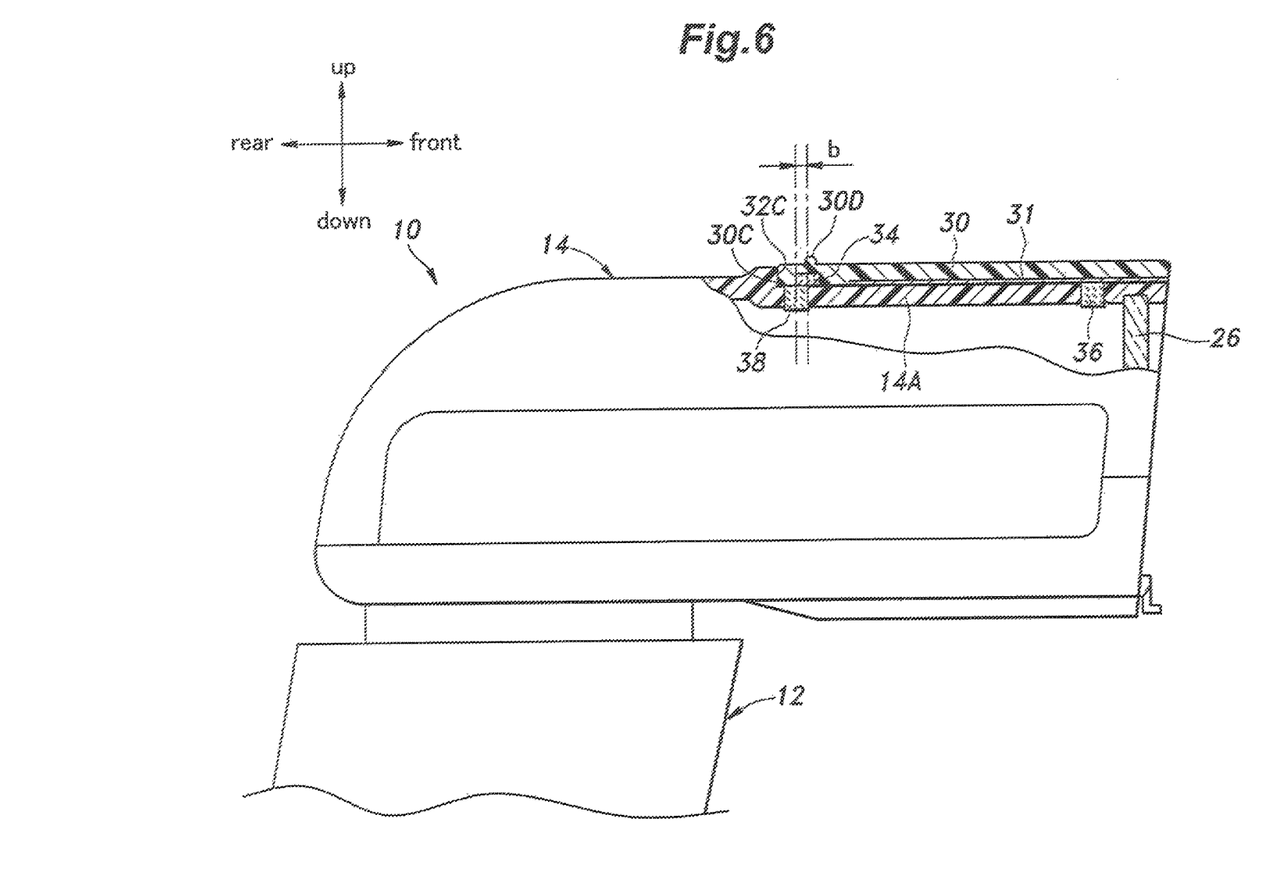
FIG. 6 is a partial cross sectional view of the strobe device according to another embodiment with the reflector in a storing position.

In addition, as shown in FIG. 6, when the reflector 30 is in the storing position, the storing position permanent magnet 38 and the reflector permanent magnet 34 are displaced from each other by a distance b in the sliding direction of the reflector 30 such that the storing position permanent magnet 38 magnetically attracts the reflector permanent magnet 34 to urge the reflector 30 toward the storing position.

According to this structure, since the use position permanent magnet 36 magnetically attracts the reflector permanent magnet 34 to urge the reflector 30 toward the use position when the reflector 30 is in the use position, a force urging the reflector 30 toward the use position always acts on the reflector 30 in the use position, whereby the reflector 30 is more stably held at the use position.

Similarly, since the storing position permanent magnet 38 magnetically attracts the reflector permanent magnet 34 to urge the reflector 30 toward the storing position when the reflector 30 is in the storing position, a force urging the reflector 30 toward the storing position always acts on the reflector 30 in the storing position, whereby the reflector 30 is more stably held attire storing position.

Although the present invention has been described in terms of preferred embodiments thereof in the forgoing, it is obvious to a person skilled in the art that the present invention is not limited to such embodiments, but various modifications are possible without departing from the spirit of the present invention.

For example, in the foregoing embodiments, each of the reflector magnetic member (34) and the main body magnetic member (36, 38) is embodied as a permanent magnet. However, it is not necessary that both of the reflector magnetic member and the main body magnetic member are permanent magnets, but one of them may be a permanent magnet and the other may be ferromagnetic material such as iron. In addition, magnetic attraction may be used at only one of the use position and the storing position. Further, the reflector 30 may be located on the underside of the upper strobe main body 14.

It is to be noted that not all the structural components in the embodiment described above are necessarily indispensable, but they may be selectively used without departing from the spirit of the present invention.

The invention claimed is:
1. A strobe device comprising:
a strobe main body including a light emitting surface;
a plate-like reflector provided on the strobe main body so as to be movable between a use position in which the reflector protrudes forward from the light emitting surface of the strobe main body and a storing position in which the reflector is retracted backward from the use position;
a reflector magnetic member made of ferromagnetic material or permanent magnet and attached to the reflector; and
a main body magnetic member made of ferromagnetic material or permanent magnet arid attached to the strobe main body, wherein when the reflector approaches at least one of the use position or the storing position, the main body magnetic member magnetically attracts the reflector magnetic member and holds the reflector at the one of the use position and the storing position by magnetic attraction,
wherein the reflector is mounted so as to be slidable in a forward and backward direction along an outer wall of the strobe main body, such that the reflector moves between the use position or the storing position by sliding relative to the strobe body main body, and
wherein the main body magnetic member and the reflector facing magnetic member are provided in the outer wall of the strobe main body and a surface of the reflector facing the outer wall, respectively,
wherein the reflector further includes a stopper for limiting the sliding movement of the reflector to at least one of the use position or the storing position by abutting a portion of the strobe main body, and
wherein when the reflector is located in the one of the use position or the storing position, the main body magnetic member and the reflector magnetic member are displaced from each other in a sliding direction of the reflector such that the main body magnetic member magnetically attracts the reflector magnetic member to urge the reflector toward the one of the use position or the storing position.

2. The strobe device according to claim 1, wherein the outer wall of the strobe main body is provided with a protruding ridge extending in the sliding direction of the reflector and wherein the reflector slidably contacts the ridge.

3. The strobe device according to claim 1, wherein the stopper is a stopper protrusion formed in a rear portion of an underside of the reflector,
wherein the outer wall of the main body defines a stopper guiding groove therein, the stopper guiding groove extending the forward and backward direction, and,
wherein the stopper protrusion slidably engages the stopper guiding groove and limits the sliding movement of the reflector to the at least one of the use position or the storing position by abutting at least one of a front wall or a rear end wall of the stopper guiding groove.

4. The strobe device according to claim 3, wherein the outer wall of the strobe main body is provided with a protruding ridge extending in the sliding direction of the reflector and wherein the reflector slidably contacts the ridge.

* * * * *